Sept. 1, 1942.  J. W. P. FLEMING  2,294,367
FLYING WING AIRPLANE
Filed March 15, 1940   2 Sheets-Sheet 1
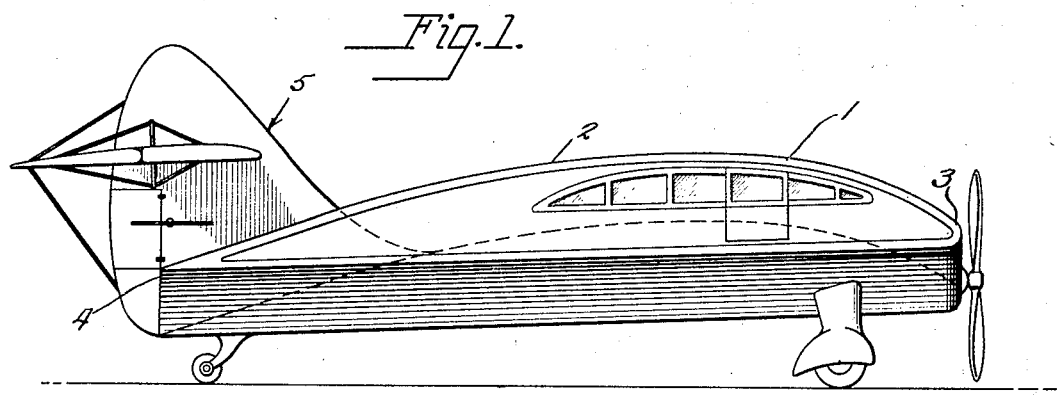
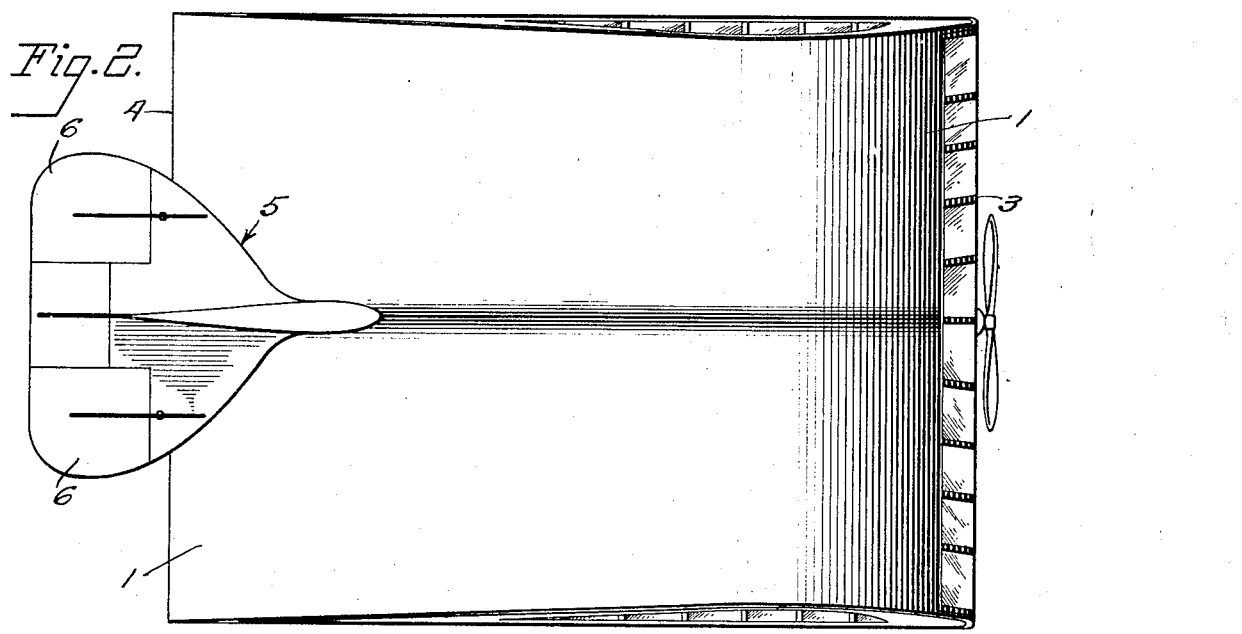
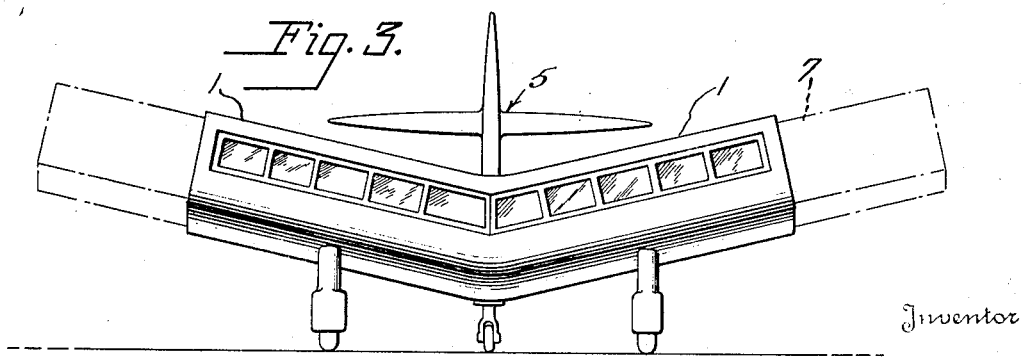
Inventor
J. W. P. Fleming

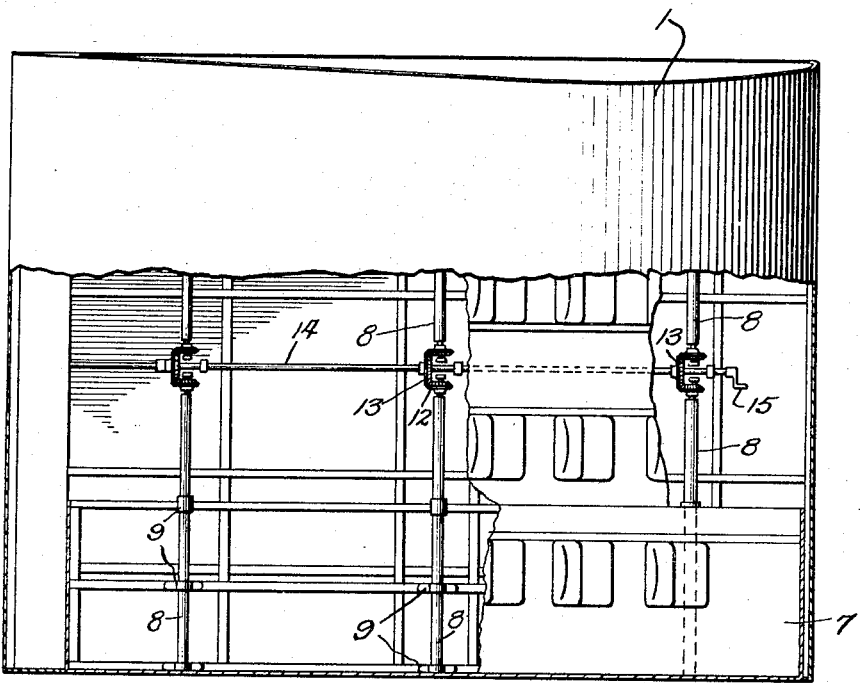
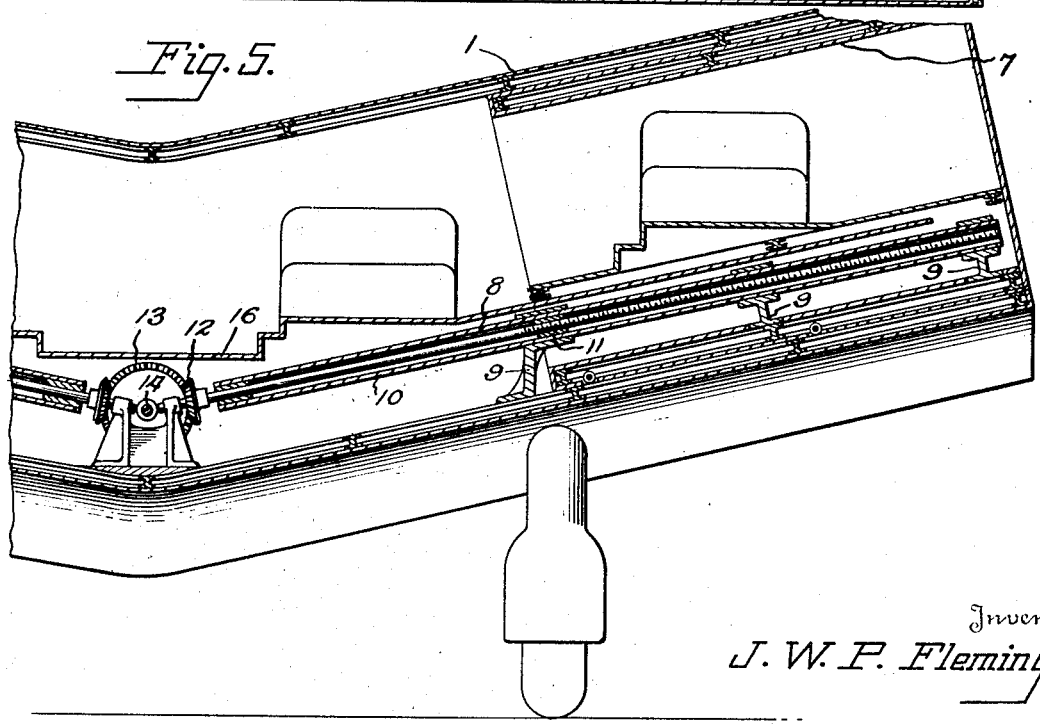

Patented Sept. 1, 1942

2,294,367

UNITED STATES PATENT OFFICE 2,294,367

FLYING WING AIRPLANE

Jacob W. P. Fleming, Falcon, Miss.

Application March 15, 1940, Serial No. 324,205

2 Claims. (Cl. 244—36)

This invention relates to improvements in airplanes and particularly to an improved combination of fuselage and wing structure.

An object of this invention is to provide increased buoyancy of a certain type of airplane, and also to provide increased stability during the time of take-off and of landing. An important object also is to increase the load capacity of such airplanes. An important object is to devise structure to present minimum resistance in flight while maintaining a high ratio of lifting capacity so that considerable loads may be carried conveniently and safely and at high speed, but so that controllable landing buoyancy shall be available. Also, a purpose of this invention is to provide airplane structure that is satisfactory in the so-called small plane field so that landing may be feasible in restricted areas. For example, a plane under this invention may land or take off in one lane of a roadway. These and other objects will be apparent in the following illustrative description of the present invention. A preferred embodiment of this invention is shown in the accompanying drawings and novel features thereof are pointed out in the appended claims. The invention comprises certain details of structure and arrangement of parts in combination as more fully described in this application.

In the drawings:

Figure 1 depicts the present invention in side elevation;

Figure 2 presents the airplane of Figure 1 in top plan view;

Figure 3 shows the airplane of this invention in front elevation;

Figure 4 details in plan view certain arrangements of parts within the airplane;

Figure 5 illustrates in vertical cross-section one side of the plane.

According to the principles of the present invention various advantages are attained by providing a combined fuselage and wing that are co-extensive with the entire surface of the plane. This airplane may be described briefly as a flying wing. Further, in preferred practice of this invention the wing-fuselage is substantially oblong and more extensive longitudinally than laterally. Moreover, under this invention the fuselage is extensible along its sides to provide additional but retractable wing area. Further, the entire conformation of the flying wing of this invention in preferred practice is of streamline arrangement, including the extensible side wings.

This invention will be described with reference to the accompanying drawings, though not limited to the particular form there shown and capable of being practised in various modifications thereof.

Referring more particularly to the drawings, there is shown, as for example in Figure 2, longitudinally predominant oblong wings 1. These wings are unitary from side to side of the plane and between the lateral extremities of the wings. It is desirable that the wings be dihedrally inclined upwardly and outwardly from the longitudinal center of plane at which point they meet as illustrated in Figure 3. The wings are of substantial body or depth so as to form a V-shaped cabin structure. This is shown for example in Figure 3. Viewed from the side, it is apparent as in Figure 1 that the depth of the wing-fuselage varies longitudinally. The bottom is of suitable conformation but for simplicity may be designated as in Figure 1 as being substantially straight. The top of the wing structure, however, throughout its entire width is curved parabolically between its leading and trailing edges. This top conveniently may be designated as 2. As shown, the top 2 flares from a blunt nose or leading edge 3 to a maximum height near the middle of the plane and then tapers throughout its width smoothly to a trailing edge 4 at the rear. In general, the cross section from front to rear may be described as that of a streamline wing with a leading blunt nose enlarged smoothly and then tapered to a trailing edge. This arrangement may also be described as a rain drop cross section at least along the upper surface.

Secured suitably at the rear of the wing 1 is tail 5 comprising vertical fins and horizontal rudder and ailerons 6, not necessary to describe here.

An important feature of this combination is the provision of supplemental extension wing surfaces throughout the entire length of this flying wing. This supplemental wing surface is contained in extensible wing-sections 7 as shown in dotted lines, Figure 3, and provided along each of the opposite edges of the fuselage. These supplemental wing sections are substantially coextensive in breadth and depth as the main wings and are of the same conformation.

The arrangement of the auxiliary wing sections 7 is such as to telescope within the fuselage or main wings and to be extended or retracted by suitable mechanism arranged within the body of the plane. A convenient means of supporting and controlling the auxiliary wing and body structure 7 is shown in Figure 5. This particular form comprises lateral tubular supports 8 mounted in suitable bearings 9. Within the supporting tubular base 8 is a rod 10 threaded into a collar or nut 11 that is fastened within the tubular support 8. At the inner end, rod 10 carries a bevel gear 12 that meshes with a companion gear 13 affixed to a central longitudinal shaft 14. This arrangement of tubular supports with geared and threaded actuating rods is disposed at suitable intervals throughout the length of the plane. As shown in Figure 4, similar supports and actuating rods are arranged at opposite sides of the central longitudinal drive rod 14. Various means may be arranged to rotate the drive rod 14. Such means are indicated, even diagrammatically, by the showing of a crank 15 on the rod 14 at the forward end of the plane.

A flooring 16 is disposed over the retracting mechanism to carry a load of any suitable character. Figures 4 and 5 illustrate flooring 16 inclined in the extensible wing sections and illustrate also passenger seats disposed in rows upon the flooring.

The illustrations emphasize that the depth or spaciousness of the flying wing throughout a considerable forward portion of the plane is sufficient to accommodate passengers if desired and illustrates also that this spacious arrangement applies also to the extensible wing-body portion of the plane.

Figure 4 and also Figure 2 illustrate the material amount of wing surface available throughout the entire length of the plane to provide stability and lifting surface, particularly at the rear of the plane. With the retracting or extensible wing sections giving greater lift at the rear corners of the plane. This extensive rear area, variable at the control of the operator, is an important factor in making feasible disposition of weight in this flying wing structure. When added weight is carried in the auxiliary wing portions extension of these portions out from the edge affords requisite buoyancy and stability for this added load. Yet the entire structure though stable is of such relatively narrow dimensions compared with its length as to require but a relatively narrow lane for landing or taking off.

In operation, the wings may be extended suitably by rotation of the central control shaft 14. Not only is the wing surface distributable but the weight of load that may be placed in the extension is available to aid in balancing the plane. It will be understood, however, that other mechanical arrangements for supporting and extending the edge portion of the wing fuselage will be within the skill of those familiar with the present art. Primarily, the present invention emphasizes the extension of the wing-fuselage and of its auxiliary edge portion substantially throughout to the rear corners of this flying wing. It will be observed that the present structure, here presented as illustrative of this invention, is of substantial depth within the body and wing, adequate to contain passengers, and therefore involves a weight and load distribution in relation to wing surface that is determined by the material depth of the wing-fuselage combination. The particular dimensions, of course, will be varied in accordance with variety in structure of different planes.

While in accordance with the patent statutes I have described a preferred embodiment of this invention, it will now be apparent to those skilled in the art that alterations and modifications may be made within the scope of the appended claims.

What I claim is:

1. An airplane comprising a unitary body and wing structure formed of a fuselage and wings continuous with each other and coextensive with each other, both longitudinally and transversely of the airplane, said fuselage and wings being complementarily united at the longitudinal center of the body, said wings extending dihedrally outwardly and upwardly in symmetrical relation, said wings being in open communication with each other at their point of junction and providing similar cabin compartments across the body and between the outer lateral extremities of the wings, wing extensions of the same cross section as the wings telescopically mounted in the wings for inward and outward sliding movement, said extensions being substantially closed at their outer ends, means for shifting the wing extensions inward and outwardly, relatively telescopic floor sections in said wing and wing extensions, and passenger seats fixedly carried by the floor sections of said wing extension whereby the load of the passengers is more evenly distributed over the increased wing area.

2. An airplane comprising a unitary body and wing structure formed of a fuselage and wings continuous with each other and co-extensive both longitudinally and transversely, said wings extending dihedrally outwardly and upwardly and being in open communication with said fuselage providing a load-carrying compartment extending across said body and wings, wing extensions forming continuations of the load-carrying compartment telescopically mounted in the wings for inward and outward sliding movement in lateral directions, means for shifting the wing extensions inwardly and outwardly, and a support fixedly mounted in each wing extension for a body of appreciable weight magnitude, movable with said wing extensions for more evenly distributing the load over the increased wing area.

JACOB W. P. FLEMING.